F. GRAEBER.
PILL BOX MAKING MACHINE.
APPLICATION FILED MAR. 6, 1913.
1,171,515.
Patented Feb. 15, 1916.
8 SHEETS—SHEET 1.
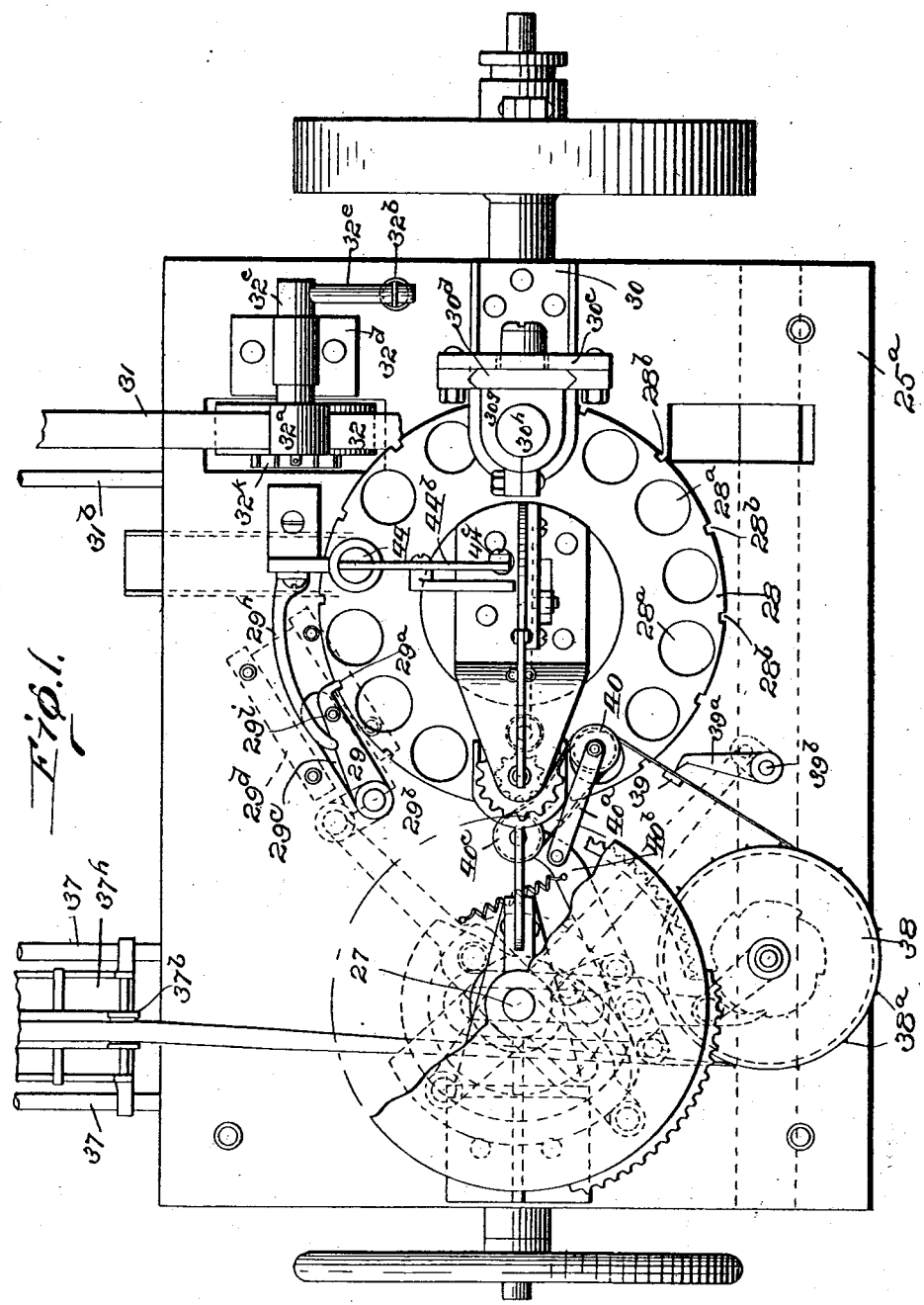
WITNESSES
INVENTOR
Frank Graeber

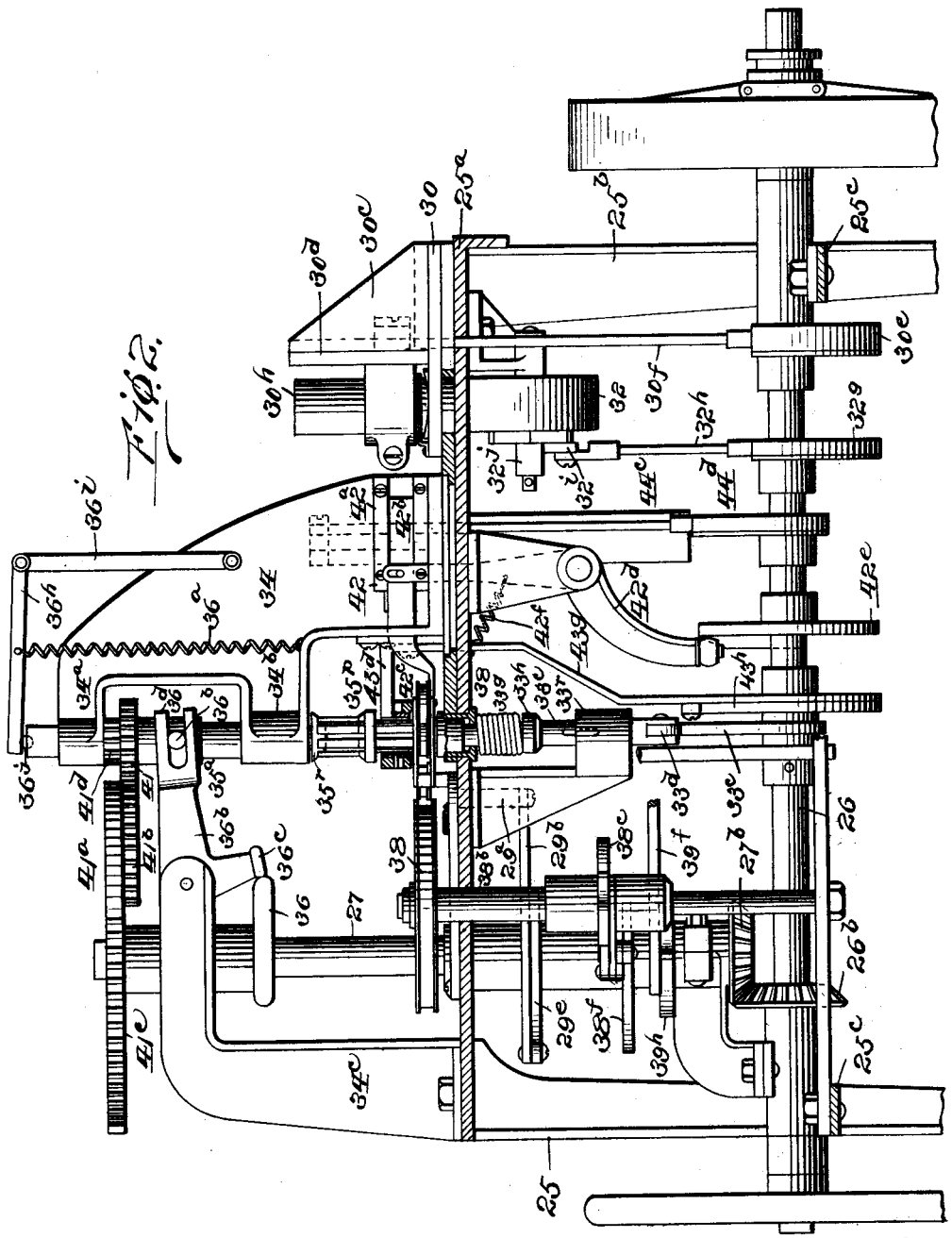

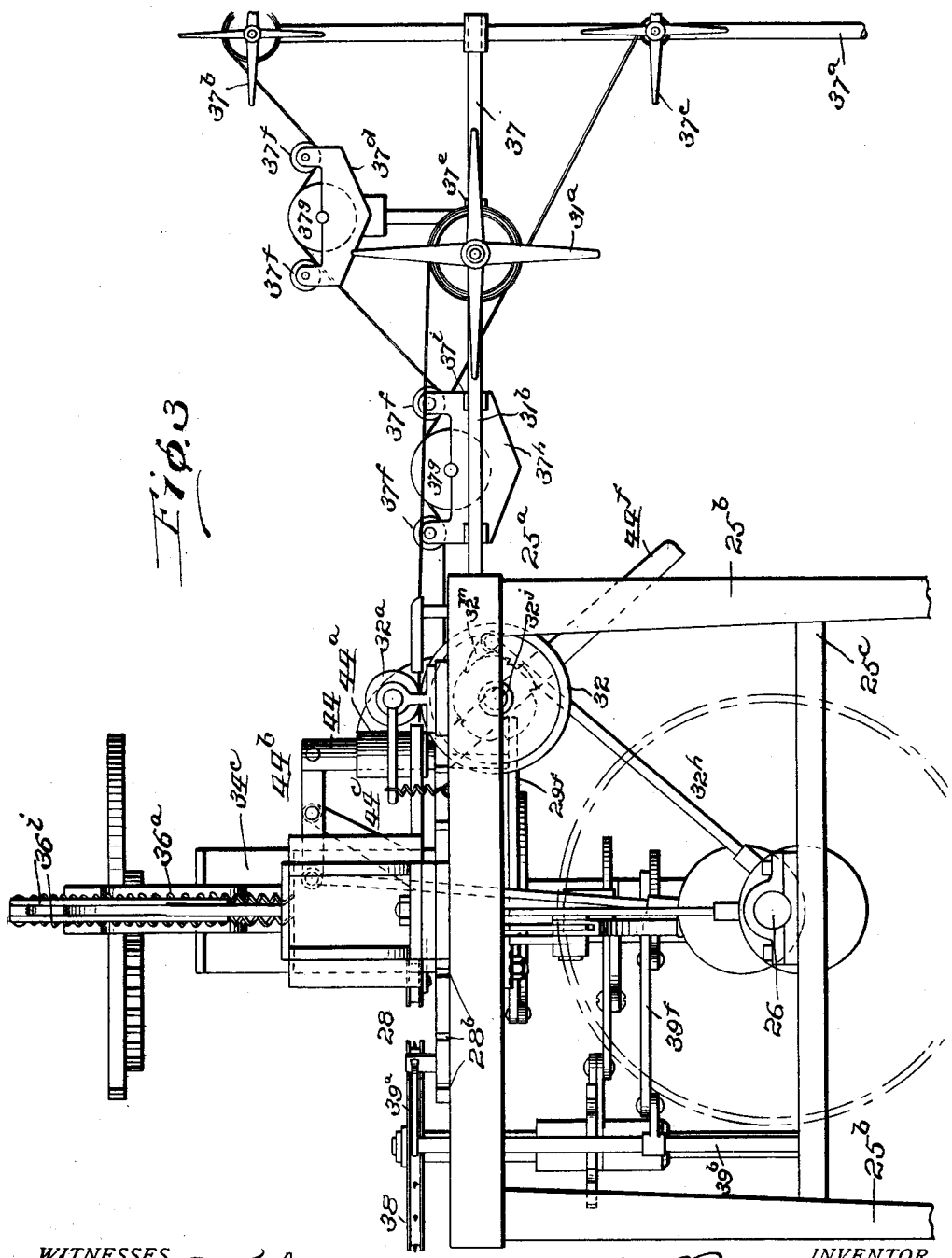

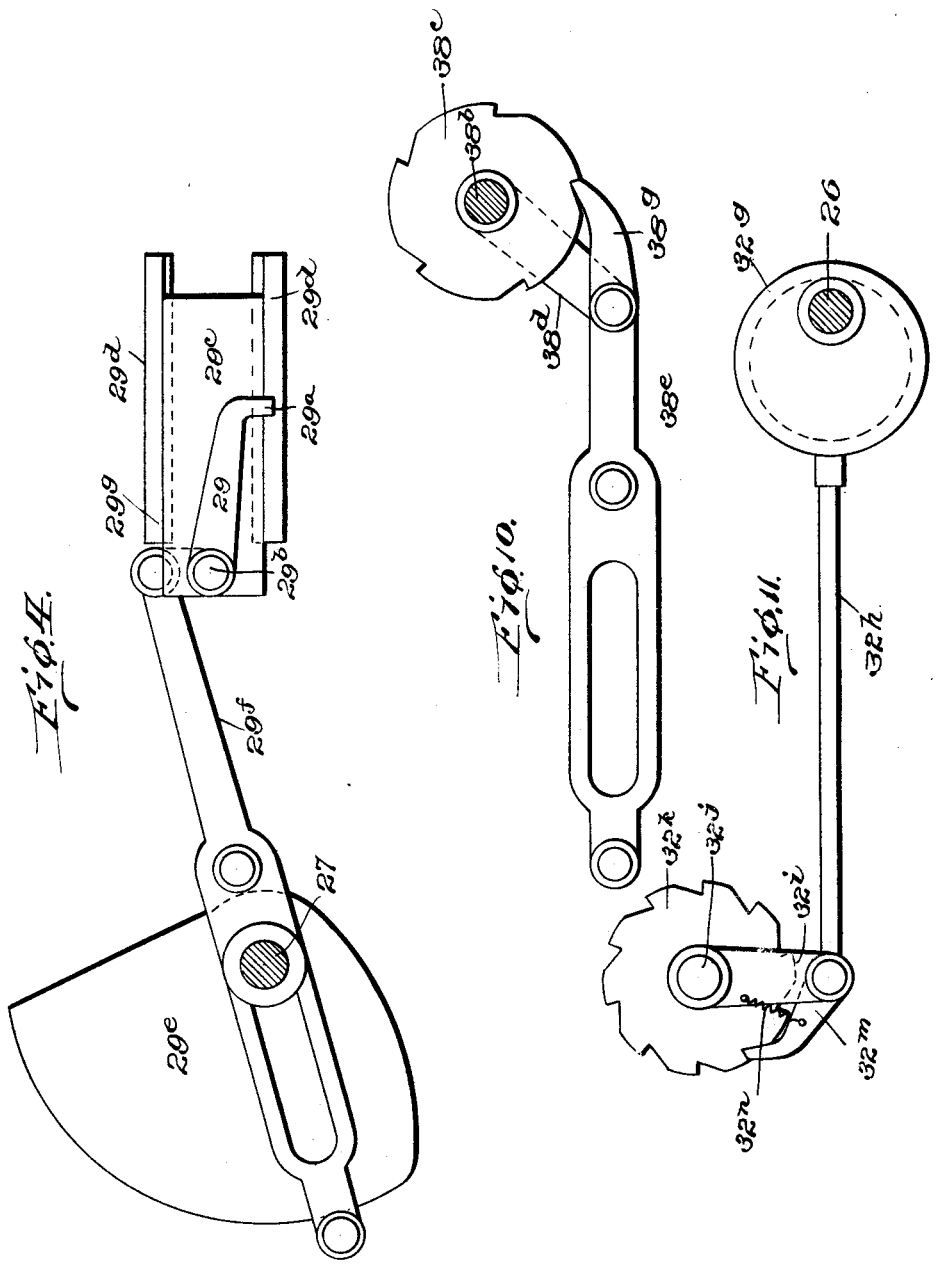

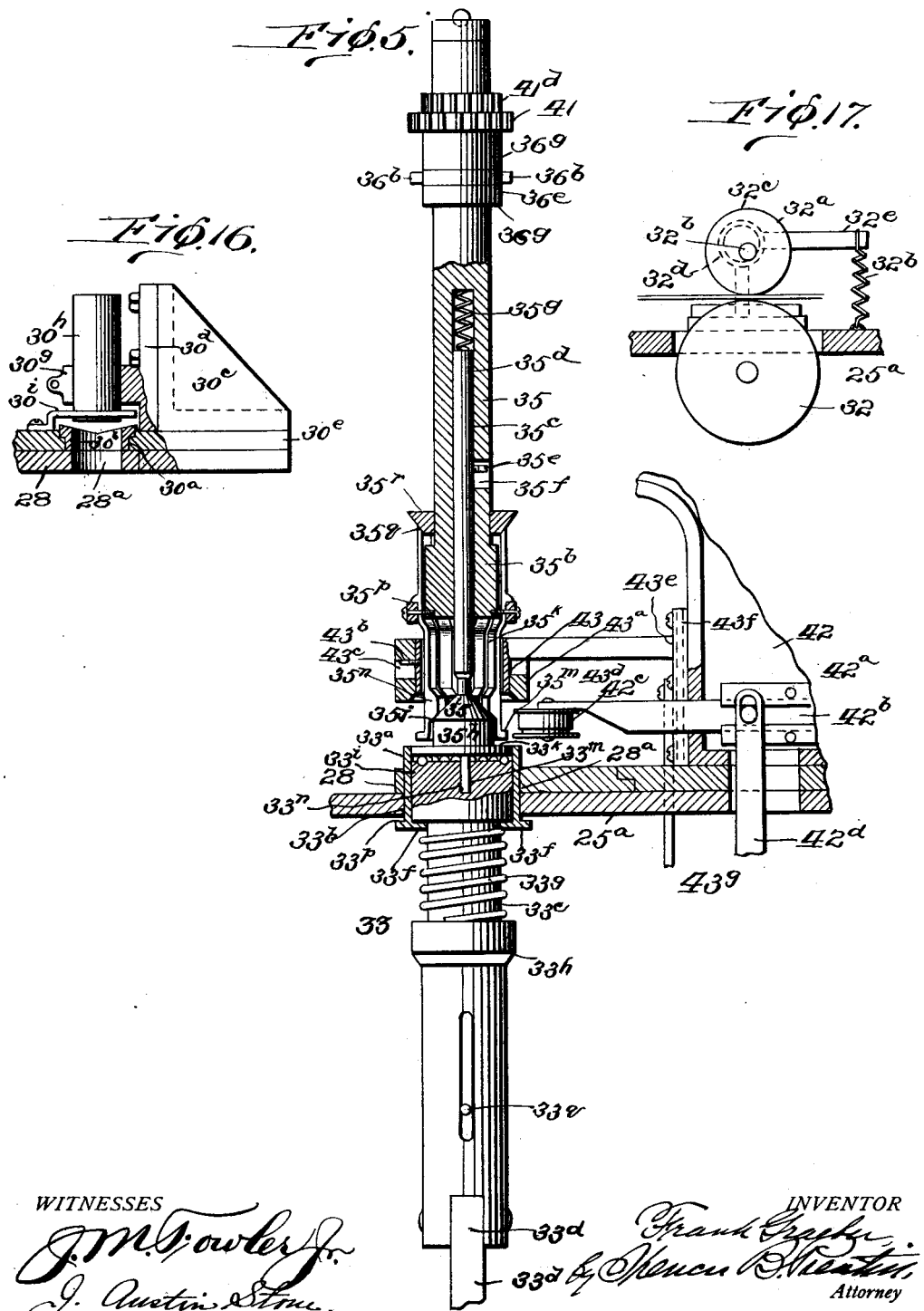

F. GRAEBER.
PILL BOX MAKING MACHINE.
APPLICATION FILED MAR. 6, 1913.
1,171,515.
Patented Feb. 15, 1916.
8 SHEETS—SHEET 6.
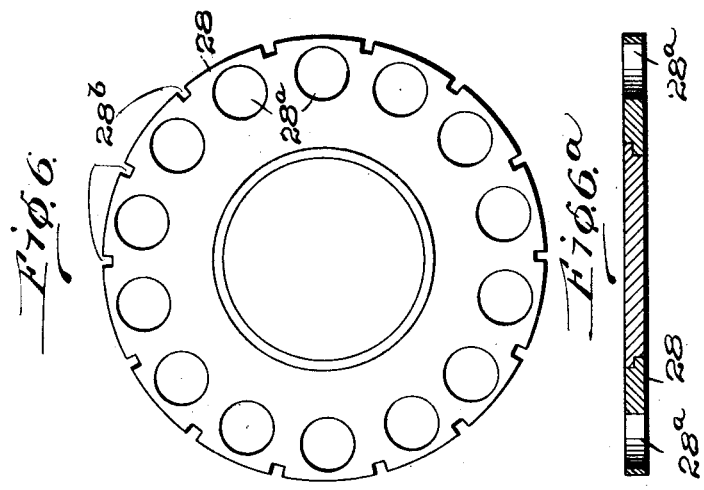
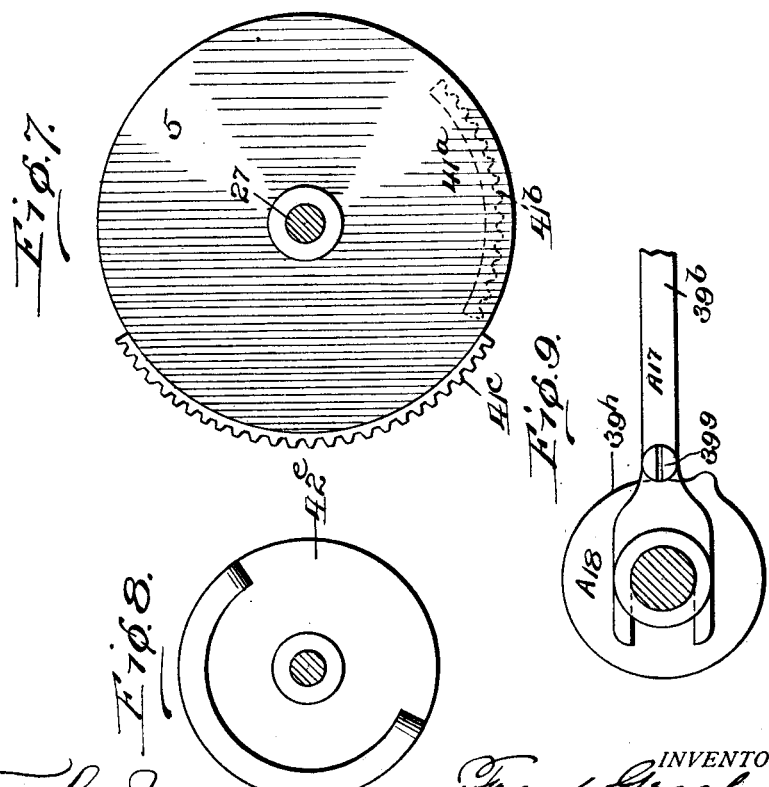
WITNESSES
INVENTOR
Frank Graeber
Attorney

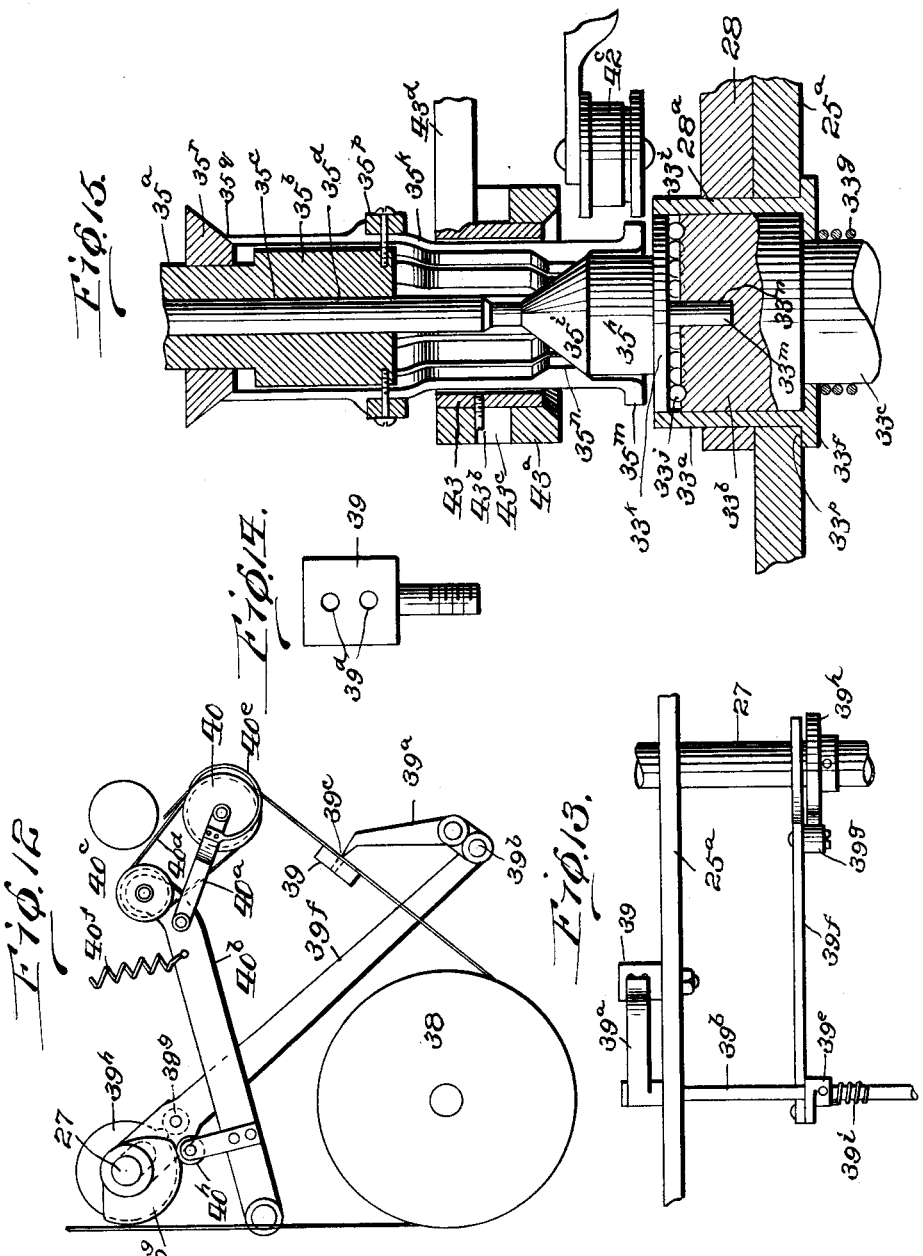

F. GRAEBER.
PILL BOX MAKING MACHINE.
APPLICATION FILED MAR. 6, 1913.
1,171,515.
Patented Feb. 15, 1916.
8 SHEETS—SHEET 8.
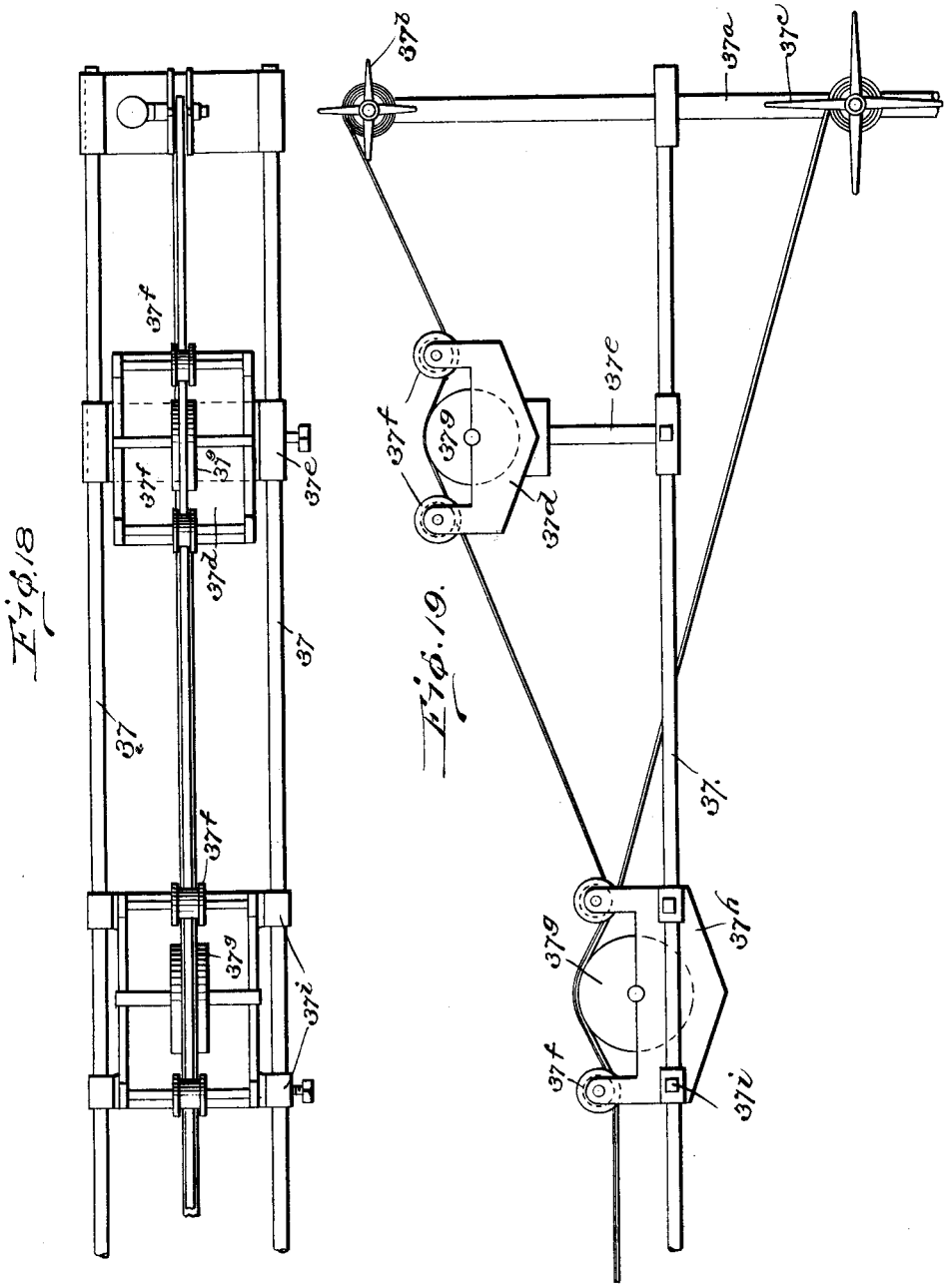

UNITED STATES PATENT OFFICE.

FRANK GRAEBER, OF NORRISTOWN, PENNSYLVANIA, ASSIGNOR TO GEORGE W. PLUMLY COMPANY, OF PHILADELPHIA, PENNSYLVANIA, A CORPORATION OF PENNSYLVANIA.

PILL-BOX-MAKING MACHINE.

1,171,515. Specification of Letters Patent. Patented Feb. 15, 1916.

Application filed March 6, 1913. Serial No. 752,450.

*To all whom it may concern:*

Be it known that I, FRANK GRAEBER, a citizen of the United States, residing at Norristown, in the county of Montgomery and State of Pennsylvania, have invented new and useful Improvements in Pill-Box-Making Machines, of which the following is a specification.

My invention relates to improvements in machines for forming and covering box elements, and particularly boxes of a shallow nature, such as are used and commonly known as pill boxes.

Among the objects of my invention are— (1). To provide a machine in which the blanks are formed, assembled and covered in a substantially automatic manner. (2). To provide a machine for this purpose in which the bottom blank is formed and positioned by the machine, carried to a covering position, the carrier receiving the rim blank before reaching such position, both blanks automatically removed from the carrier and covered and then returned to the carrier and discharged therefrom as a completed box element. (3). To provide mechanism for this purpose in which an extended portion of the strip is brought into contact with the blanks before the latter are rotated to apply the strip to prevent lost motion between strip and blank, restrict the length of the strip, and insure of an accurate positioning of the strip. (4). To provide mechanism in which the box blanks are given rotation at different speeds during the strip applying operation. (5). To provide a mechanism in which the pressures placed upon the blanks will be yieldable. (6). To provide a mechanism in which a box will be completed during each cycle of operations of the machine elements.

Other and further objects of the invention are to provide a construction which is simple and efficient in operation, durable in construction, and which can be manufactured at a comparatively low cost.

To these and other ends, the nature of which will be readily understood as the invention is hereinafter disclosed, said invention consists in the improved construction and combination of parts hereinafter fully described, illustrated in the accompanying drawings, and more particularly pointed out in the appended claims.

In the accompanying drawings, in which similar reference characters indicate similar parts in each of the views, Figure 1 is a top plan view of a machine constructed in accordance with my invention. Fig. 2 is a side elevation of the same, partly in section. Fig. 3 is an end view looking from the right in Fig. 1. Fig. 4 is a detail view showing the mechanism employed in giving the step by step movement to the carrier. Fig. 5 is a detail view, partly in elevation and partly in section, showing the upper and lower mandrels. Fig. 6 is a plan view of the carrier disk. Fig. 6ª is a longitudinal sectional view of the same. Fig. 7 is a detail view of the mutilated gear employed for rotating the upper mandrel. Fig. 8 is a detail view of the cam employed in actuating the pressure applying roll. Fig. 9 is a detail view showing the cam for operating the strip weakening device. Fig. 10 is a detail view of the mechanism for providing the step by step movement to the strip feeding roll. Fig. 11 is a detail view of the actuating mechanism for providing the step by step movement to the bottom blank strip. Fig. 12 is a detail view showing the mechanisms employed in feeding the strip to the box blanks, the means for weakening the strip at intervals, and the means for applying the strip to the blanks. Fig. 13 is a detail view of the mechanism for actuating the strip weakening device. Fig. 14 is a detail view of a block employed in the strip weakening mechanism. Fig. 15 is a detail sectional view of the adjacent portions of the upper and lower mandrels and the parts of the pressure applying and tucking in mechanism adjacent thereto, said view being on an enlarged scale compared with Fig. 5. Fig. 16 is a detail view of the structure for cutting the bottom blanks. Fig. 17 is a detail view of the mechanism for feeding the bottom blank strip. Figs. 18 and 19 are top and side elevations respectively of the adhesive applying means for the strip, said views showing the manner in which the compound strip is formed.

The machine herein disclosed, in producing the commercial box, embodies a number of devices correlated as to operation to provide a succession of actions which combinedly produce the complete box element during one cycle of operations. For the purpose of more clearly explaining the parts, I will at this point give a statement of the successive operations and their effect on the box element parts.

The box element to be formed is either the top or the bottom portion of what is commonly known as a pill box, comprising a flat disk and an annulus to be secured thereto, the whole being covered by a strip which acts to secure the annulus to the disk. The top and bottom elements of the box are secured together by telescoping the annulus of the bottom within that of the top or vice versa, and the present apparatus may be employed for producing either element. However, for the purpose of disclosing the invention, it is assumed that the bottom element is being formed.

The successive operations employed for the purpose of producing the element are first to stamp out the disk forming the bottom and positioning this disk within a carrier which is movable to place the disk in position for the covering operation, the carrier receiving the annulus or rim in suitable manner while traveling to the covering mechanism. When the disk and the rim reach the proper position, these parts are first positioned one relative to the other in the positions which they assume in the completed element, this action being provided by suitable mandrels, after which the two parts are raised out of the carrier to expose the periphery of the rim and disk, and placed in position where a covering strip can be applied. In this position the strip is moved into contact with the periphery of the exposed parts of the element and the elements rotated causing the strip to adhere to the periphery and project above and below the top and bottom of the element. Forming rollers are then brought into position and the mandrel given further movements thus firmly securing the covering in position on the periphery and at the same time bending the projecting edges inwardly; the rolls are then withdrawn and the tucking-in element brought into operation, said element acting to tuck the top projecting edge into the inner periphery of the rim, this action taking place while the element is being rotated by the mandrel. The covered element is then returned to its position within the carrier, one of the mandrels, during this movement, positioning the projecting edge at the bottom and securing it in place. Upon return of the box element to its position in the carrier, the mandrels are withdrawn and the carrier moved so as to place the completely covered box element in the path of an ejecting mechanism which has the effect of discharging the element from the carrier into a chute.

The covering is provided by strips of paper which are adhesively connected together and which have the inner faces provided with an adhesive coating by means of which the strip can be secured; this strip is introduced into the mechanism in the form of a continuous strip and at a point within its travel prior to reaching the box element, is subjected to the action of a cutter which acts to weaken the strip on a line corresponding to the line of severance of the strip, this severance taking place at the time the strip is placed in covering position on the box element.

With this general statement of the successive operations, I will proceed to describe the construction of a preferred embodiment of a machine for producing this result.

25 designates a suitable frame having a bed $25^a$, legs $25^b$, and cross pieces $25^c$, the latter carrying bearings for a shaft 26 which provides the drive for the machine, said shaft, if desired, having a suitable arrangement for coupling the shaft to the power.

The shaft 26 extends horizontally and is provided with a bevel gear $26^b$, the latter meshing with a complemental gear $27^b$, mounted on a shaft 27 extending vertically, the shaft 26 being located below the bed $25^a$, while shaft 27 projects through and above said bed; these shafts carry the various cams for operating the devices to produce the successive operations. These devices will be described in the order of their operation as indicated above.

28 designates a disk mounted to rotate on a vertical axis above the bed $25^a$, said disk being provided with a plurality of openings $28^a$ arranged in spaced apart relation on a concentric line, these openings being adjacent the outer periphery of the disk, the spacing of the openings being equidistant, said openings being preferably of circular contour and of a size to receive the disk of the box element. The disk 28 lies on top of the bed $25^a$, so that the latter normally acts as a bottom for the openings.

The disk 28 is adapted to be moved intermittently in a rotary direction, the movement being such as to place the openings successively in position to receive the disk and to position the assembled parts in position to be acted upon by the covering mechanism. To provide this movement, I preferably employ a suitable dog adapted to engage in notches $28^b$ on the periphery of the disk, said dog, indicated at 29, having a nose $29^a$, and being mounted on a vertical shaft $29^b$ extending through the bed $25^a$, said shaft having its lower end mounted on a slide $29^c$ carried in guides $29^d$ provided therefor on the under face of the bed. The movements of the dog to advance the disk 28 and then return to normal position, are provided by a cam $29^e$ mounted on the shaft 27, the connections being by means of a bar $29^f$ carrying rollers adapted to travel on the cam face, said bar being slotted to embrace the shaft 27 and at the same time reciprocate in the action of the cam. The opposite end of the bar 29$^f$ is connected to the outer end of an arm 29$^g$ carried by the shaft 29$^b$, thus placing the reciprocations of the bar 29$^f$ on the slide to reciprocate the slide in its guide and at the same time move the nose 29$^a$ within one of the notches 28$^b$ of disk and retain it therein during the advancing movement of the disk, the return movement of the bar 29$^f$ acting, through the leverage disclosed, to release the dog from its notch before returning the dog to its normal position. To prevent the dog from moving an excessive distance on its axis, I provide a curved arm 29$^h$ with the inner face of which a roller 29$^i$ carried by the dog contacts during the return movement of the bar 29$^f$, thus enabling the slide 29$^c$ to be returned to normal position and at the same time provide the pressure on the dog desired to retain the nose 29$^a$ in engagement with the disk during the advance movement of the parts.

30 designates a plate mounted on the bed 25$^a$ with its inner portion projecting over the top of the disk 28, said disk moving between the bed and the under face of said plate 30. Said plate is provided with an opening 30$^a$ positioned to be axially alined with an opening 28$^a$ when the disk is at rest, the opening 30$^a$ being adapted to receive a die plate 30$^b$ in the form of an annulus, the central opening of which corresponds to the size and peripheral configuration of the disk which forms the bottom of the completed box element. Mounted in a suitable bracket 30$^c$ is a slide 30$^d$ adapted to reciprocate in a vertical direction by means of an eccentric 30$^e$ mounted on the shaft 26, a pitman 30$^f$ serving to connect the eccentric with the slide. Said slide 30$^d$ carries a clamping device 30$^g$ for a plunger or punch 30$^h$, the latter being adapted to substantially fit the interior of the die plate 30$^b$. The lower face of the plunger is normally located above and spaced from the top of the die plate 30$^b$, the space between said die plate and plunger being adapted to receive a strip of suitable material such as cardboard from which the bottoms are to be punched or cut. To provide for a smooth punching operation, the upper face of the die plate is preferably formed with inclined faces as indicated in Fig. 16.

The strip of material from which the bottoms are punched, and which is indicated at 31, is preferably carried by a reel 31$^a$, the latter being of suitable construction and carried by a bracket 31$^b$ mounted on the bed of the machine.

For the purpose of feeding the strip 31 to the punching mechanism, I employ rollers 32 and 32$^a$, the former having its axis located below the bed and the latter above the bed, the roller 32 projecting above the bed through an opening formed therein for the purpose. The roller 32$^a$ is mounted on a spindle 32$^b$, Fig. 17, projecting from the end of a shaft 32$^c$, said shaft being mounted in suitable bearings 32$^d$, the spindle being located eccentrically of the end of the shaft in order that a pivotal movement of the latter will act to shift the axis of the roller 32$^a$. The shaft 32$^c$ is provided with a lateral arm 32$^e$, the free end of which carries one end of a spring 32$^f$, the opposite end of which is connected to the bed 25$^a$. This particular arrangement provides for a yielding of the roller 32$^a$, the purpose of which is to prevent excessive pressure being placed on the strip and to accommodate for different thicknesses of the strip, it being readily understood that the introduction of the strip between the rollers will cause the roller 32$^a$ to be moved away from the roller 32 without affecting the mounting of this roller on the spindle, the latter moving and providing a slight rotative movement to the shaft 32$^c$ against the tension of the spring 32$^f$.

The feeding movement of the rollers 32 and 32$^a$ is provided by moving the roller 32, and since the strip must obviously be moved intermittently to permit the punching operation, the roller 32 is given an intermittent motion, this motion being provided by an eccentric 32$^g$ mounted on the shaft 26, said eccentric being adapted to provide a reciprocating movement to a pitman 32$^h$ connected to an arm 32$^i$ having its opposite end connected to the shaft 32$^j$ of the roller 32. Mounted on said shaft 32$^j$ is a toothed member 32$^k$, and mounted on the pivot of the connection of pitman 32$^h$ with arm 32$^i$ is a pawl 32$^m$ normally held in engagement with the face of the member 32$^k$ by spring 32$^n$, this particular structure of operating mechanism being shown in detail in Fig. 11.

As will be readily understood, a single revolution of the shaft 26 will provide an advance and a return movement of the pitman 32$^h$, this movement of the pitman causing the pawl 32$^m$ to advance the member 32$^k$ the distance of one tooth, thereby moving the strip a distance sufficient to carry the punched portion out of the punching device and placing another portion of the strip in position therein.

The eccentrics 30$^e$ and 32$^g$ and the cam 29$^e$ are timed so as to provide for a movement of the disk 28 to position its opening 28$^a$ beneath the opening 30$^a$, a feed of the strip 31 to position an imperforate portion beneath the plunger 30$^h$, and while the disk is at rest, a depression of said plunger for the purpose of punching the bottom from the strip and placing the bottom practically at the lower end of the opening 28$^a$ just above the top of the bed 25$^a$.

It will be understood that as the successive openings 28$^a$ are brought into position with respect to the plunger 30ʰ, a bottom will be placed therein, the movements of the disk gradually carrying the openings around to a position where the box element is covered. In the drawings, the latter position is shown as diametrically opposite from the punching position, but it will be obvious that this particular point is not material, as the covering mechanism may be located at any suitable point in the travel of the disk with the exception of a point closely adjacent to the punching mechanism in the direction of disk travel. The reason for this latter is that it is necessary to insert the rims within the openings 28ᵃ, and this must be done before the opening reaches the position in which it is operated upon to provide the covering operation.

The rims are pre-formed and can be inserted within the opening in any suitable manner. No mechanism is shown in the drawings for this purpose, the rims being placed in position manually. However, constructions for depositing ring-like parts at a predetermined position are well known, and the positioning of a device of such type so as to deposit a rim within an opening 28ᵃ before the latter reaches the covering position, can be readily provided.

As indicated, the intermittent movement of the disk or carrier 28 places an opening 28ᵃ in axial alinement with the covering mechanism and as the box elements (the bottom and rim) cannot be covered while within the opening 28ᵃ, these elements are raised out of the openings, and the mechanism for so positioning the elements will now be described.

33 designates the lower mandrel, and comprises a sleeve 33ᵃ mounted on a head 33ᵇ, the latter being carried by a stem 32ᶜ having at its lower end a roll 33ᵈ which is adapted to travel on the face of a cam 33ᵉ carried by the shaft 26, said sleeve and head being axially alined, the sleeve being movable longitudinally relatively to the head as presently explained, but having a fit thereon sufficient to cause the sleeve to act as a guide for the head, the sleeve having a shoulder 33ᶠ which is adapted to contact with the under face of the head, being normally held in contact therewith by a spring 33ᵍ located between the lower face of the sleeve and a collar 33ʰ mounted on the stem 33ᶜ and adjustable longitudinally of the stem. The upper face of the head is preferably provided with a raceway 33ⁱ adapted to receive anti-friction devices 33ʲ, and mounted on said devices is a plate 33ᵏ having a stem 33ᵐ adapted to extend into a recess 33ⁿ formed in the head, this particular construction permitting a rotation of the plate 33ᵏ with the stem as an axis.

The sleeve and head are of such relative length that when the shoulder 33ᶠ is in contact with the head, the upper face of the sleeve is substantially on the plane of the upper face of the plate 33ᵏ; these parts are adapted to reciprocate through an opening formed in the bed 25ᵃ, and the normal position of such top plane of plate and sleeve is in the plane of the top of the bed, or just below such plane, thus permitting the disk to travel over the top of the mandrel when the latter is in normal position, said sleeve and head, however, being movable into and through the opening 28ᵃ which is axially alined therewith, such movement placing the bottom blank on top of the plate.

In view of the fact that it is necessary that the covering strip extend over the edge of the bottom blank, the movement of the sleeve is controlled so as to provide an annular space around the plate 33ᵏ when the lower mandrel is in raised position, this being provided by forming a shoulder 33ᵖ on the outer periphery of the sleeve, said shoulder being adapted to abut against the under face of the bed prior to the time the mandrel reaches its upper extreme of movement, the result being that when contact of the shoulder is had with the head, the further movement of the mandrel will cause the head to continue to move in the same direction and thus project the plate 33ᵏ above the top of the sleeve, this action increasing the compression of the spring 33ᵍ and insuring that the roller is maintained in contact with the face of the cam. If desired, suitable means may be provided for preventing a turning of the stem 33ᶜ on its axis, the drawings disclosing the use of a pin and slot connection, the stem being slotted to receive a pin 33ᵠ carried by a bracket 33ʳ which acts to guide the stem.

The upper mandrel structure comprises a plurality of elements which co-act in the box covering operation with other elements presently described, said mandrel including elements which coöperate with the lower mandrel just described in positioning the box blanks to be acted upon by the covering mechanism, and at this point I will describe these coöperating elements.

34 designates a bracket arm projecting from the top of the bed 25ᵃ and provided with alined bearings 34ᵃ and 34ᵇ spaced apart with their axes in alinement with the axis of the lower mandrel, said bearings being adapted to receive a reciprocating member 35 which forms the body portion of the upper mandrel, being in the form of a shaft 35ᵃ having its lower end in the form of an enlarged head 35ᵇ. The shaft and head are provided with an axial recess 35ᶜ which is adapted to receive the stem or shank 35ᵈ of a holding member, said member being adapted to reciprocate in said recess, the length of reciprocation being controlled by means of a pin 35ᵉ carried by the stem 35ᵈ and projecting into a slot 35ᶠ formed in the body portion 35. As seen in Fig. 5, the stem 35ᵈ does not project to the bottom of the recess 35ᶜ, and mounted within the space between the bottom of the slot and the end of the stem is a spring 35ᵍ, said spring normally tending to retain the member in its lower position with the pin 35ᵉ in contact with the bottom of the slot 35ᶠ, said spring permitting a yielding movement of the member upon application of pressure to the outer end of the member within the limits of the movement permitted by the pin and slot connection referred to; said spring acting to return the member to normal position when the pressure is released.

The lower end of the member is in the form of an enlarged head 35ʰ, said head having its upper face cone shaped, as at 35ⁱ, said cone surface being adapted to coöperate with the lower inclined surfaces 35ʲ of a series of fingers 35ᵏ carried by the head 35ʰ, said fingers having their lower ends provided with outwardly extending flanges 35ᵐ, and having the inclined surfaces 35ʲ as the lower face of an inwardly projecting portion or lug 35ⁿ, said inner faces, when the position of the head 35ʰ permits, passing into the space above said head, the stem 35ᵈ being reduced in size above said head to permit the movement of the fingers as presently described.

The fingers 35ᵏ are spaced about the periphery of the head 35ʰ, being supported on the head by means of a collar 35ᵖ secured to the head, the connection being such that the fingers may have a slight rocking action on the collar, the upper ends of the fingers being beveled as at 35ᵠ to coöperate with the beveled face of a loose collar 35ʳ mounted on the shaft 35ᵃ. The structure of the fingers is such as to cause them to be relatively light in weight, and consequently the weight of the collar 35ʳ is sufficient, when the lower ends of the fingers are free to move inwardly, to cause such inward movement of the fingers, this movement being permitted when the head is in such position that the inclined faces 35ʲ may move inwardly.

The shaft 35ᵃ is adapted to be reciprocated in the bearings 34ᵃ and 34ᵇ, and this reciprocation is provided in one direction through mechanism operated by a cam 36, and in the other direction by means of a spring 36ᵃ, the cam being mounted upon the shaft 27. The connections between the cam and the shaft include a bell crank lever 36ᵇ pivoted on a bracket 34ᶜ which forms a bearing for the shaft 27, and one end of the lever is provided with a roller 36ᶜ adapted to coöperate with the face of the cam 36, the opposite end of the lever being forked, as at 36ᵈ, and adapted to embrace a collar 36ᵉ free to rotate relative to the shaft 27, said collar having pins 36ᶠ adapted to enter recesses within the fork 36ᵈ; the collar 36ᵉ is prevented from moving longitudinally of the shaft 35ᵃ by suitable means such as collars 36ᵍ located above and below the collar 36ᵉ. The spring connection with said shaft 35ᵃ is provided by means of a bar 36ʰ pivotally supported at one end by straps 36ⁱ the opposite end of the bar being adapted to rest upon a ball 36ʲ mounted upon the upper end of the shaft 35ᵃ, the spring 36ᵃ having one end connected to said bar intermediate its ends with the other end of the spring connected to the bracket 34. By this arrangement, the spring 36ᵃ, which is preferably duplicated on opposite sides of the bracket arm 34, exerts a pressure on the upper end of the shaft 35ᵃ and tends to move said shaft downwardly while the cam 36 and its connections tend to move the shaft upwardly against the tension of said spring.

The upper and lower mandrel structure just described is that which is employed in positioning the blanks for the covering operation, and this positioning action is substantially as follows: When one of the openings 28ᵃ is brought into axial alinement with the mandrels, at which time the disk 28 is at rest, the shaft 35ᵃ is left down through the action of the spring 36ᵃ and the shape of the cam 36, until the bottom of the head 35ʰ comes into contact with the top surface of the bottom blank, it being understood that the normal position of the parts of the upper mandrel is such that this lower face of the head 35ʰ is located above the top plane of the disk 28, thus enabling the disk to have its movement thereunder. This contact of the head with the bottom blank acts to place said blank between the plate 33ᵏ and the bottom of the head 35ʰ, these two parts practically clamping the disk in such position; since the rim blank is loose within the opening, it will be understood that should the bottom blank not be carried entirely to the bottom of the opening 28ᵃ by the punching mechanism, the rim blank will follow the bottom blank when the latter is acted upon by the head 35ʰ. While this contact is made between the bottom of the head 35ʰ and the bottom blank, the movement of the shaft 35ᵃ downwardly continues, and this has the effect of causing the head to recede relatively to the fingers, the result being that while the flanges 35ᵐ were in position to enter the rim blank when the contact was first made between the head and bottom blank, the relative movement of head and fingers under the continued movement of the shaft 35ᵃ will cause the coöperating faces 35ⁱ and 35ʲ to force the lower ends of the fingers outwardly, the result being that the outer faces of the flanges 35ᵐ contact with the inner periphery of said rim blank and position the blank relatively to the bottom and to firmly withstand the covering pressures. After this contact has been made and both blanks positioned, the upward movement of the lower mandrel takes place, this movement causing both mandrels to be moved upwardly to carry the positioned blanks out of the opening 28ª, the movements of the parts carrying the blanks into the plane of the mechanism for feeding and applying the covering strip. Before this point is reached, however, the sleeve 33ª will have been held from continued movement, thus causing the bottom blank to be spaced above the top plane of the sleeve and supported in this position by the plate 33ᵏ and the parts of the upper mandrel heretofore described.

The return movement of the box takes place after the blanks have been covered, and this return movement will be explained at this point to complete the cycle of operations in the positioning of the box blanks and box.

After the blanks have been covered and if desired, just prior to the return movement of the box, the cam 36 becomes active to raise the shaft 35ª a distance sufficient to carry the lower ends of the fingers 35ᵏ upwardly thus releasing the engagement of the inclined faces 35ⁱ and 35ʲ sufficiently to permit the box to move under the return movement of the lower mandrel, the spring 35ᵍ acting to hold the head 35ʰ in contact with the bottom of the box while the cam 33ᵉ permits the return movement of the lower mandrel. However, this releasing action may be deferred until the box has been returned to position within the opening without affecting the general operation.

When the lower mandrel has completely receded, the box is in correct position within the opening 28ª, after which the parts are raised so as to entirely remove the upper mandrel from the plane of the opening and thereby permit the disk to rotate to position the next blank in position for action.

The covering strip preferably employed in connection with the boxes of this type is vari-colored, viz., of at least two colors, the preferred colors being black and white, the black being of less width than the white and secured to the outer surface thereof in a manner to provide, in strip form, the appearance of a black stripe extending approximately centrally of the width of the white portion, the stripe running lengthwise of the strip. This combined strip is formed as needed, the following mechanism being employed for that purpose.

37 designates a pair of rods, one end being connected to the frame, the opposite end being connected to a suitable support 37ª. These rods are spaced apart and extend in the same horizontal plane, being of a length sufficient to provide for adjustability in the position of a pair of glue pots to be described. The support is provided with a pair of reels 37ᵇ and 37ᶜ, the former being located at the upper end of the support, while the latter is located between the point of connection of rods 37 and the bottom of the support, the upper reel being adapted to carry a roll of black surfaced paper or similar material, the bottom reel carrying the white paper. These strips are adapted to be connected by adhesive, and for this purpose, the under surface of the black strip is passed through a glue pot 37ᵈ, said pot being mounted upon a bracket 37ᵉ carried by and adjustable longitudinally of said rods. The glue pot is provided with a pair of rolls 37ᶠ located at the opposite ends of the pot and forming idlers against which the upper surface of the strip is adapted to contact in moving forward, and a roller 37ᵍ mounted intermediate the rolls 37ᶠ and adapted to have its periphery take up the adhesive from the pot, the underside of the strip traveling in contact with the coated surface of roller 37ᵍ by means of which said strip under surface is coated with the adhesive.

37ʰ designates the glue pot for the white strip, the latter being located between the machine proper and the bracket 37ᵈ, being secured in suitable members 37ⁱ adapted to be slidable on said rods 37 and provided with means for adjusting its position longitudinally of said rods. Said glue pot 37ʰ is somewhat similar in structure to the pot 37ᵈ, the main difference being in the width of the roller and rolls and particularly with respect to the width of the groove which is formed on the rolls, this difference in width being due to the difference in width of the strips, it being understood that the grooves of the rolls of the pot 37ᵈ are of a width to receive the black strip, while those of the pot 37ʰ are adapted to receive the white strip, the walls forming the sides of the grooves acting as guides in carrying the strips over the adhesive applying rollers. The white strip is led direct from its reel to the first grooved roll of the pot 37ʰ while the black strip is first passed through its glue pot, as heretofore explained, and then led to the grooved roll of the white glue pot being positioned between the white strip and the bottom of the groove. In view of the fact that the grooved rolls of each of the pots act to retain the strip out of a straight line, it will be understood that under the pulling action presently described, sufficient pressure is placed upon the black strip during the passage through the second glue pot to cause said strip to be firmly secured to the outer or upper face of the white strip, thus completing the formation of the strip.

The combined strip is led from the second glue pot to the periphery of a roller or wheel 38 mounted to rotate on a vertical axis above the bed of the machine and substantially in the plane of the box blanks when the latter are raised to covering position as heretofore explained, it being understood that the strip will be given the necessary twist to change its plane from a horizontal to a vertical one in passing from the glue pot to the periphery of this wheel, the adhesive coated side of the strip being exposed. For the purpose of retaining the strip in position and also to act to feed the strip through the glue pots, I provide the periphery of the wheel 38 with a plurality of pins 38$^a$, these pins projecting outwardly in a radial direction and being adapted to penetrate the strip and act to draw it along.

The roller or wheel 38 is moved intermittently, its movement taking place when the strip is to be fed toward the box. The wheel 38 is mounted on a vertical shaft 38$^b$ extending through the bed and having a toothed or notched disk 38$^c$ secured thereto; said shaft also loosely carries an arm 38$^d$, the free end of which is pivotally connected to a reciprocating member 38$^e$, the movements of which are provided by a cam 38$^f$, said arm 38$^d$ and member 38$^e$ forming an element for supporting a pawl 38$^g$ which is adapted to co-act with the teeth or notches of the disk 38$^c$ to advance said disk a predetermined distance, this movement of the disk having a similar effect on the wheel 38. The pawl may be normally held in contact with the face of the disk in suitable manner as by a spring.

As will be understood, a complete rotation of the cam 38$^f$ will cause the pawl supporting element to have one complete movement forward and return, this movement having the effect of advancing the disk 38$^c$ the distance of one tooth, this distance corresponding to the feed of the strip a distance sufficient to provide for the covering of one box. The strip is then led to the mechanism for applying it to the box blanks, but in passing to this mechanism, it is led past a cutting mechanism which acts to partially sever the strip at a point corresponding to the desired length of the covering strip, this partial severing acting to weaken the strip at this point sufficiently to enable the covering mechanism, etc., to provide the actual severance as presently described.

The cutting mechanism is shown in the drawings as comprising a block 39 secured to the upper face of the bed, and a cutting member 39$^a$, the strip being led between these parts. The cutting member is mounted at the upper end of a shaft 39$^b$ extending through the bed of the machine, said member being in the form of an arm having its end extending laterally to provide a sharpened edge 39$^c$, the latter being adapted to contact with the strip in opposition to the block 39, said block being provided with suitable means for preventing a complete severance of the strip by the edge 39$^c$, one form of means being indicated at 39$^d$ in the form of depressions, it being understood that while the edge 39$^c$ and the main portion of the block will have relative pressures sufficient to provide a cutting of the strip, the depressions in the block will permit parts of the strip to not be subjected to such pressure, the result being that opposite these depressions the strip will not be severed. This particular construction is simply an example, it being readily understood that other devices for weakening the strip at this point, may be employed as for instance the use of an edge 39$^c$ of a length less than the width of the strip; thus leaving the edges of the strip unsevered.

For providing the movements of the cutting member 39$^a$, I mount on the shaft 39$^b$ a collar 39$^e$, said collar having an arm to which is connected the outer end of a pitman 39$^f$, the latter carrying a roll 39$^g$ adapted to coöperate with the cam face of a cam 39$^h$ mounted on the shaft 27. A spring 39$^i$ acts to retain the roll 39$^g$ in contact with the cam and hence serves to return the knife to its normal inoperative position, the cam providing the pressure for severing the strip.

After passing the severing or cutting mechanism, the strip is led to the periphery of a wheel 40 pivotally mounted in an extension 40$^a$ of an arm 40$^b$, the latter being pivotally supported above the bed 25$^a$. Said arm also carries a roll 40$^c$, said roll and the wheel 40 carrying a belt or band 40$^d$ of suitable cross sectional configuration, and which may and preferably is formed of rubber in order that it may readily yield under the operations presently described. If desired, the cross sectional configuration of the belt or band 40$^d$ may be such as to provide a recess to receive the projecting portion of the bottom blank when the belt is brought into contact with the positioned blanks, it being understood that the peripheries of the wheel 40 and roll 40$^c$ will be arranged accordingly. The extension 40$^a$ is adjustable pivotally on the arm 40$^b$ in order to provide the desired tension on the belt. The combined strip is led on to the surface of this belt, and passes beneath a spring 40$^e$ which acts as a holding means for the strip after it has been severed.

The arm 40$^b$ is adapted to be moved on its pivot in directions to bring the strip mounted on the belt into contact with the periphery of the blanks, the latter having been moved by the mandrels to the covering position, as heretofore explained, this movement of the arm being provided by a spring 40$^f$ which becomes effective for this purpose when a cam 40$^g$ coöperating with a roll 40$^h$ reaches a position to permit such movement of the arm, said cam acting to positively move the arm away from the covering position. This arrangement causes the pressure which will be placed upon the periphery of the box blanks to be yielding, and if desired, the tension may be adjustable by suitably adjusting the tension of spring 40ᶠ. The cam is so timed as to permit this action of the spring after the blanks have been placed in position, and to move the arm when the covering strip has been placed in position on the blank, this latter operation being provided through a single rotation of the mandrels as presently described, this particular mechanism serving simply to place the covering strip in position on the box blank and when this action is completed the mechanism becomes inactive until the succeeding box blanks are placed in position, the return movement of the arm serving to place a sufficient strain on the weakened line of the strip to complete the severing operation, leaving the end of the strip in position where the succeeding advance movement of the arm will bring it into contact with the succeeding blanks, the spring 40ᵉ retaining the strip in position while awaiting the succeeding operation.

As heretofore pointed out the covering strip is of a width greater than the exposed peripheries of the box blanks, the result being that when this strip applying operation is completed, the strip will be adhesively connected to the periphery of the blanks with the edge portions of the strip projecting above and below the top and bottom planes of the blanks, the sleeve 33ᵃ being held away from the top plane of the plate 33ᵏ, as heretofore explained, to permit of the lower edge extending in this manner.

I have heretofore referred to rotating the mandrels during the strip applying operation just described, this movement of the mandrels acting to feed the strip and to move the belt in the direction to provide such feeding operation. This movement is provided through the operations of mechanism carried respectively by the shaft 27 and shaft 35ᵃ, the latter having a gear 41, while the shaft 27 carries a disk 41ᵃ having two racks 41ᵇ and 41ᶜ, these racks being located on different vertical planes and operating at different times, the rack 41ᵇ being positioned to coöperate with the gear 41 when the shaft 35ᵃ is raised, the rack being positioned to provide an engagement with the gear 41 when the mandrels are to be rotated for the purpose of applying the strip to the box blanks, said rack having a length to cause substantially a single rotation of the upper mandrel, the ball bearing support for the plate 33ᵏ permitting said plate to rotate with the upper mandrel without affecting the position of the body portion of the lower mandrel. The relative sizes of the rack 41ᵇ and gear 41 are such as to provide a relatively slow rotation of the shaft 35ᵃ. The rack 41ᶜ is adapted to coöperate with a pinion 41ᵈ positioned above the gear 41, and the rack and pinion engagement takes place shortly after the completion of the single rotation of the shaft, this engagement acting to provide a more rapid rotation to the shaft, this rack being of a length to provide for more than a single rotation to the shaft. In practising the invention I have provided two complete rotations to the shaft through this particular engagement with satisfactory results, and it is to be understood that I prefer to employ at least this number, the rotation provided by the different engagements referred to providing rotations to the shaft 35ᵃ at different speeds. This more rapid movement takes place during the pressure applying and tucking in operations now to be described.

42 designates a bracket provided with a horizontal guide 42ᵃ within which is mounted a slide 42ᵇ, the outer end of which carries a flanged roll 42ᶜ, the distance between the flanges of the roll being approximately the distance between the top and bottom planes of the box blanks, the roll preferably having an additional groove to receive the projecting ledge of the bottom blank. The roll 42ᶜ is adapted to be moved into and out of contact with the strip covered periphery of the box blanks. The movement in one direction is provided through the medium of a bell crank lever 42ᵈ adapted to be operated in one direction by a cam face of cam 42ᵉ mounted on shaft 26, this being the return movement, the opposite movement being provided by a spring 42ᶠ, said spring becoming effective to move the roll 42ᶜ into contact with the box when the cam face reaches a position to permit the spring to act, this particular arrangement providing for a yielding pressure of the roll on the box blank. This roll is in contact with the face of the blank when the shaft is given its second or rapid rotations, thus acting to effectively secure the strip to the box blanks and at the same time turn the edges inwardly so as to place them in position to be secured, the flanges of the roller serving to turn these edges at substantially right angles to the plane of the rim periphery.

When the roll has completed its operation and been withdrawn, the inturned strip edge at the top of the box blank is tucked in and secured in position, this being provided by a pair of sleeves 43 and 43ᵃ carried by the shaft 35ᵃ, the sleeve 43 being mounted directly on the shaft and having an internal diameter approximating the internal diameter of the rim blank (preferably slightly less), the sleeve 43ᵃ being mounted on the sleeve 43 and movable longitudinally thereof, said sleeve 43ᵃ being supported by means of a pin 43ᵇ projecting from the sleeve 43 and entering a slot 43ᶜ carried by the sleeve 43ᵃ. The sleeve 43 is provided with an arm 43ᵈ the upper end of which is connected to a slide 43ᵉ adapted to move vertically in guides 43ᶠ carried by bracket 42, said slide being adapted to be moved by means of a pitman 43ᵍ adapted to be actuated by a cam 43ʰ.

During the latter part of the second rotative movements of the shaft 35 and after the roll 42ᶜ has been withdrawn, the sleeve 43 is moved downwardly (the sleeve 43ᵃ following this movement being loose on sleeve 43), this action placing the lower end of the sleeve 43ᵃ on the top edge of the rim blank, said sleeve having a configuration to permit this action to take place and having an inner diameter approximating the internal diameter of the rim blank. When said sleeve 43ᵃ reaches the top, the continued movement of the sleeve 43 provides a relative movement between the sleeves, the sleeve 43 passing below the top plane of the rim blank, thus turning the upper edge of the strip (which had been turned in by the roller 42ᶜ) directly into and in contact with the inner face of the rim blank, the rotation of the shaft causing said sleeve 43 to adhesively connect said edge interiorly of the box while the sleeve 43ᵃ acts to secure the strip along the edge of the rim blank. The parts are returned to normal position after the turning in operation has been completed, although the particular time when the return movement takes place may extend to the time when the mandrels begin or are making their return movements, the upward movement of the slide acting to carry the sleeve 43 upwardly until contact is had between the pin and upper end of the slot, whereupon both sleeves move in unison.

After the tucking in operation of the upper edge of the strip is completed by the downward movement of the sleeve 43 and the rotation of the box blanks through the rotation of the shaft 35ᵃ, the mandrels begin their return movement, this action causing the head 33ᵇ of the lower mandrel to recede into the sleeve 33ᵃ until the shoulder 33ᶠ is encountered by the lower face of the head, after which both head and sleeve continue the downward or return movement in unison.

As the movement of the head 33ᵇ causes it to reach the end of its independent return movement, the upper face of the sleeve 33ᵃ comes into contact with the turned in lower edge of the strip and presses such turned in portion into contact with and adhesively secures it to the bottom of the bottom blank, thus completing the securing of the strip in position as a covering for the box blanks and completing the box element.

Both the upper and lower mandrels retain their holding contact with the bottom of the box during the return movement of the box to the opening 28ᵃ, so that the box will be properly positioned to readily enter within such opening. When the lower mandrel has reached its normal position out of the plane of the disk 28, the upper mandrel is raised through the action of cam 36 until the bottom face of the head 35ʰ is positioned above the top plane of the disk, the parts in this position having the flanges 35ᵉ in their inward position through the action of the collar 35ᶠ. The disk 28 is then given its advancing movement to carry the completed box element out of alinement with the mandrels, this movement bringing the succeeding opening 28ᵃ into such alinement, whereupon the box blanks in that opening are given the operations heretofore described for the purpose of covering the same.

As will be understood, the completed box when returned to position by the mandrels, lies within the planes of the disk 28. For the purpose of removing the completed box element, I employ a suitable releasing or ejecting mechanism in the form of a plunger 44 mounted to reciprocate vertically in a bracket 44ᵃ carried by the bed of the machine, said plunger having a loose connection with the outer end of a pivoted lever 44ᵇ, the inner end of which is connected to a rod 44ᶜ having its lower end formed to be operated by an eccentric 44ᵈ carried by the shaft 26, the eccentric being timed to depress the plunger 44 when the disk is at rest with an opening 28ᵃ directly below the bottom of the plunger. The bed is provided with an opening into or through which the completed box is carried by the depression of the plunger, a suitable chute 44ᵉ being provided below the opening for the purpose of receiving and possibly transferring the completed box element to a suitable receptacle. This operation frees the opening 28ᵃ leaving it unoccupied to receive the box blanks when the opening is moved to the proper position for receiving the blanks as heretofore pointed out.

It is believed that the description of the operation given above in connection with the different elements will clearly indicate the operation of the machine as an entirety, it being understood that in the form shown in the drawings the bottom punching operation for positioning a bottom blank in one opening takes place while the blanks within another opening are being moved to covering position, covered, and returned to such position; and that during the same period of rest for the disk a completed box is being removed from the disk. As a result, a completed box element is formed substantially at each advance movement of the disk, the cycle of operations of the elements heretofore described being completed during one such advance movement of the disk.

It will be understood that the only manual operation required, so far as the disclosure of the drawings is concerned, is that of placing the rim blank in position in the opening, and since this requires no expert labor, it will be readily understood that the operation as a whole is practically a mechanical one and requires little or no attention, thereby rendering the apparatus one which is adapted to produce the box element at a relatively low cost.

Attention is called to the fact that in each of the operations where pressure is being applied to the box blanks, the pressure is a yielding one being provided by a spring or its equivalent and thereby permitting a control of the pressure through variations in tension or compression of the springs. For instance, the bottom blank is held in position against the tension of spring 35$^g$ and possibly 36$^a$; the strip is applied under the pressure of spring 40$^e$; the pressure on the applied strip is provided by the spring 42$^f$; the pressure of the fingers 35$^k$ on the rim blank is the difference between the power of springs 35$^g$ and 36$^a$ in connection with the relatively inclined faces of the fingers and the head 35$^h$; and the pressure applied in securing the lower edge of the strip to the bottom of the box is that of spring 33$^g$. This particular arrangement prevents damage to the blanks although operated upon mechanically, permitting the employment of stock relatively light in weight.

I desire to call particular attention to several of the features hereinbefore explained. For instance, the free end of the strip which is to be applied is so located on the strip applying belt that the movement of the belt to strip applying position places a considerable portion of this strip end in contact with the periphery of the box blanks; consequently there is a surety of the strip being drawn forward during the rotation of the mandrel by reason of the extensive surface connection of this strip end, and as a result, I am able to provide little or no overlap of the strip on the box; furthermore, there is practically no liability of lost motion between the strip and box blanks during the rotation of the mandrels.

In this connection I desire to call attention to the use of the belt in the strip applying operation, this arrangement permitting a considerable surface of the belt to be brought into contact with the periphery of the blanks, a result not obtainable by the use of a wheel or slide, at the same time providing for the extended initial contact of strip and blank.

Another feature of importance is the rotation of the shaft at intervals and at different speeds, the first speed being relatively slow and employed during the strip-applying operation, thus placing no undue strain on the strip and at the same time insuring that the latter will be properly positioned on the box blanks; the relatively rapid rotation of the mandrels with the number of rotations given to it which succeeds the relatively slow movement, provides not only for efficiency in operation, but also insures the application of an equal pressure and without liability of affecting the blanks, the operation being rapidly performed so that the adhesive connection will be properly made before the adhesive has had an opportunity of becoming hardened, the result being the elimination of any liability of forming blisters, etc., in the strip.

Other features are the ability to provide a relatively compact structure and at the same time produce a maximum output.

While I have herein shown and described a preferred embodiment of the invention, it will be readily understood that changes and modifications therein may be required or desired to meet the exigencies of use, and I therefore desire it to be understood that I reserve the right to make any and all such changes and modifications as may be found desirable or necessary, in so far as the same may fall within the spirit or scope of the invention as expressed in the accompanying claims.

Having thus described my invention what I claim as new is:

1. In a machine of the class described, a blank carrier adapted to receive disconnected blanks, means for positioning the blanks relative to each other while within the carrier, means for temporarily withdrawing the positioned blanks from the carrier, and means for covering and securing the blanks together while temporarily withdrawn.

2. In a machine of the class described, a blank carrier adapted to receive disconnected blanks, means for positioning the blanks relative to each other while within the carrier, means for temporarily withdrawing the positioned blanks from the carrier, means for covering and securing the blanks together while temporarily withdrawn, and means for automatically removing the completed blank from the carrier after the latter has been returned to its position therein.

3. In a machine of the class described, a blank carrier intermittently movable on a vertical axis to provide a path of travel to blanks, covering mechanism, said carrier moving the blanks to said covering mechanism, means for temporarily removing the blanks from the carrier to permit the covering operation and for returning the covered blank to the carrier, and means for removing the covered blank element from the carrier after it has been returned thereto.

4. In a machine of the class described, a blank carrier intermittently movable on a vertical axis to provide a path of travel to blanks, covering mechanism, said carrier moving the blanks to said covering mechanism, means for temporarily removing the blanks from the carrier to permit the covering operation and for returning the covered blank to the carrier, means for removing the covered blank element from the carrier after it has been returned thereto, the covering operations and the removal of the covered blank from the carrier taking place at different points in the travel of the latter.

5. In a machine of the class described, an intermittently movable carrier, means for forming and positioning a blank element within the carrier, covering mechanism spaced from said means to provide a travel of the carrier from said means to the covering mechanism to permit reception of a complemental blank element prior to reaching the covering mechanism, means for temporarily withdrawing the blanks from the carrier to permit the covering mechanism to act thereon, said carrier acting to carry the covered blanks after being returned to position.

6. In a machine of the class described, an intermittently movable carrier, means for forming and positioning a blank element within the carrier, covering mechanism spaced from said means to provide a travel of the carrier from said means to the covering mechanism to permit reception of a complemental blank element prior to reaching the covering mechanism, means for temporarily withdrawing the blanks from the carrier to permit the covering mechanism to act thereon, said carrier acting to carry the covered blanks after being returned to position, means being provided for positioning the blank elements relative to each while within the carrier prior to the withdrawal movement.

7. In a machine of the class described, an intermittently movable carrier, means for forming and positioning a blank element within the carrier, covering mechanism spaced from said means to provide a travel of the carrier from said means to the covering mechanism to permit reception of a complemental blank element prior to reaching the covering mechanism, means for temporarily withdrawing the blanks from the carrier to permit the covering mechanism to act thereon, said carrier acting to carry the covered blanks after being returned to position, and means for removing the covered blanks from the carrier, said means and the covering mechanism being located at different points in the travel of the carrier.

8. In a machine of the class described, an intermittently movable carrier, means for forming and positioning a blank element within the carrier, covering mechanism spaced from said means to provide a travel of the carrier from said means to the covering mechanism to permit reception of a complemental blank element prior to reaching the covering mechanism, means for temporarily withdrawing the blanks from the carrier to permit the covering mechanism to act thereon, said carrier acting to carry the covered blanks after being returned to position, means for removing the covered blanks from the carrier, said means and the covering mechanism being located at different points in the travel of the carrier, means being provided for positioning the blank elements relative to each while within the carrier prior to the withdrawal movement.

9. In a machine of the class described, blank forming mechanism, covering mechanism, a blank carrier common to both mechanisms and adapted to carry the blanks from the forming mechanism to the covering mechanism, and means for temporarily withdrawing the blanks from the carrier to a covering position within the covering mechanism and for returning the covered blank after the covering operation, the withdrawal and returning movements of the blank being in directions corresponding to the blank axis.

10. In a machine of the class described, covering mechanism, a blank carrier movable beneath said mechanism, and means for temporarily withdrawing the blanks from the carrier and positioning them within the covering mechanism, the blank being supported by said means on its upper and lower faces while withdrawn.

11. In a machine of the class described, covering mechanism, a blank carrier movable beneath said mechanism, means for temporarily withdrawing the blanks from the carrier and positioning them within the covering mechanism, said latter means including opposing mandrels and gripping fingers carried by one of the mandrels and operative upon axial movement of that mandrel.

12. In a machine of the class described, covering mechanism, a blank carrier movable beneath said mechanism, means for temporarily withdrawing the blanks from the carrier and positioning them within the covering mechanism, said latter means including opposing mandrels movable axially in opposite directions to grip the blank, said mandrels moving in unison in the same direction to withdraw the blank after being gripped.

13. In a machine of the class described, covering mechanism, a blank carrier movable beneath said mechanism, means for temporarily withdrawing the blanks from the carrier and positioning them within the covering mechanism, said latter means including opposing mandrels movable axially in opposite directions to grip the blank, said mandrels moving in unison in the same direction to withdraw the blank after being gripped, one of said mandrels being yieldingly supported during the latter movement.

14. In a machine of the class described, covering mechanism including a pair of mandrels movable axially to position the blanks within the covering mechanism, one of said mandrels being rotatable at different speeds after the blank has been positioned.

15. In a machine of the class described, covering mechanism including a pair of mandrels movable axially to position the blanks within the covering mechanism, one of said mandrels being rotatable at different speeds after the blank has been positioned, said rotative movements being successive.

16. In a machine of the class described, covering mechanism operating to apply a strip to a blank and including a pair of mandrels movable axially to position the blanks within the covering mechanism, one of said mandrels being rotatable at different speeds after the blank has been positioned, said rotative movements being successive, with the slower movement in advance and providing the strip-applying operation.

17. In a machine of the class described, covering mechanism operating to apply a strip to a blank with the strip smoothed out by pressure and tucked in, said mechanism including a pair of mandrels movable axially to position the blanks within the covering mechanism, one of said mandrels being rotatable at different speeds after the blank has been positioned, said rotative movements being successive, with the slower movement in advance and providing the strip-applying operation, the succeeding movement being relatively rapid to provide for the pressure applying and tucking-in operation on the strip.

18. In a machine of the class described, a blank carrier, opposing mandrels having relative movements to yieldingly clamp box elements, said mandrels being movable in unison in one direction into and out of said carrier to position said elements within strip-applying mechanism, the opposite movement of said mandrels returning the completed box to position within the carrier.

19. In a machine of the class described, a blank carrier, opposing mandrels having relative movements to yieldingly clamp box elements, said mandrels being movable in unison in one direction into and out of said carrier to position said elements within strip-applying mechanism, the opposite movement of said mandrels returning the completed box to position within the carrier, and strip-applying mechanism operable when said mandrels are in strip-applying position.

20. In a machine of the class described, a blank carrier, opposing mandrels having relative movements to yieldingly clamp box elements, said mandrels being movable in unison in one direction into and out of said carrier to position said elements within strip-applying mechanism, the opposite movement of said mandrels returning the completed box to position within the carrier, strip-applying mechanism operable when said mandrels are in strip-applying position, said mechanism including means for feeding the strip as it is being applied.

21. In a machine of the class described, a blank carrier, opposing mandrels having relative movements to yieldingly clamp box elements, said mandrels being movable in unison in one direction into and out of said carrier to position said elements within strip-applying mechanism, the opposite movement of said mandrels returning the completed box to position within the carrier, strip-applying mechanism operable when said mandrels are in strip-applying position, said mechanism including means for feeding the strip as it is being applied, and independent mechanism for partially severing the strip during periods of inactivity in the strip feed.

22. In a machine of the class described, opposing mandrels having relative movements to yieldingly clamp box elements, said mandrels being movable in unison in one direction to position said elements within strip-applying mechanism, the opposite movement of said mandrels returning the completed box to position, strip-applying mechanism operable when said mandrels are in strip-applying position, said mechanism including means for feeding the strip as it is being applied, independent mechanism for partially severing the strip during periods of inactivity in the strip feed, said strip-applying mechanism being movable toward and from the box elements, the movement away from said elements acting to sever the strip after it has been applied.

23. In a machine of the class described, a blank carrier, opposing mandrels having relative movements to yieldingly clamp box elements, said mandrels being movable in unison in one direction into and out of said carrier to withdraw the blank elements from the carrier and position said elements within strip-applying mechanism, the strip-applying mechanism movable toward and from the clamped elements, and tucking-in mechanism operable while said elements are clamped.

24. In a machine of the class described, a blank carrier, opposing mandrels having relative movements to yieldingly clamp box elements, said mandrels being movable in unison in one direction into and out of said carrier to withdraw the blank elements from the carrier and position said elements within said strip-applying mechanism, the strip-applying mechanism movable toward and from the clamped elements, tucking-in mechanism operable while said elements are clamped, said strip-applying mechanism being movable away from the elements prior to the activity of the tucking-in mechanism.

25. In a machine of the class described, a blank carrier, opposing mandrels having relative movements to yieldingly clamp box elements, said mandrels being movable in unison in one direction into and out of said carrier to withdraw the blank elements from the carrier and position said elements within strip-applying mechanism, strip-applying mechanism movable toward and from the clamped elements, tucking-in mechanism operable while said elements are clamped, one of said mandrels being rotatable during the period of activity of the strip-applying mechanism.

26. In a machine of the class described, opposing mandrels having relative movements to yieldingly clamp box elements, said mandrels being movable in unison in one direction to position said elements within said strip-applying mechanism, strip applying mechanism movable toward and from the clamped elements, tucking-in mechanism operable while said elements are clamped, said strip-applying mechanism being movable away from the elements prior to the activity of the tucking-in mechanism, one of said clamping mandrels being rotatable at different speeds, the change in speed taking place between the periods of activity of the strip-applying and the tucking-in mechanisms.

27. In a machine of the class described, a mandrel comprising members movable axially relatively to each other, one of said members carrying a plurality of blank positioning and forming fingers, the other of said members co-acting with the fingers to change the latter from inoperative to operative blank-supporting positions during such relative movements.

28. In a machine of the class described, a mandrel comprising members movable axially relatively to each other, one of said members carrying a plurality of fingers, the other of said members co-acting with the blank positioning and forming fingers to change the latter from inoperative to operative blank-supporting positions during such relative movements, the coöperating elements being in the form of faces inclined to the axis of the members.

29. In a machine of the class described, a mandrel comprising members movable axially relative to each other, one of said members carrying a plurality of fingers, the other of said members co-acting with the blank positioning and forming fingers to change the latter from inoperative to operative blank-supporting positions during such relative movements, the coöperating elements being in the form of faces inclined to the axis of the members, and means for normally retaining said fingers in a predetermined position.

30. In a machine of the class described, strip-applying mechanism including a band-like member carrying the strip to be applied and adapted to be moved toward and from strip-applying position, said member being adapted to be driven by the rotation of the part to which the strip is being applied, said member and the part to which the strip is being applied forming the sole feeding means for the strip, and means whereby said member will be held in contact with the part yieldingly.

31. In a machine of the class described, strip-applying mechanism including a band-like member carrying the strip to be applied and adapted to be moved toward and from strip-applying position, said member being adapted to be driven by the rotation of the part to which the strip is being applied, means whereby said member will be held in contact with the part yieldingly, and a yieldable member acting as a strip retaining element to retain the unapplied strip in contact with the band.

32. In a machine of the class described, strip-applying mechanism, means for supplying a continuous strip to said mechanism and means for partially severing the strip into predetermined lengths prior to its reaching said mechanism, said means including a stationary abutment in the path of movement of the strip, and an oscillating severing member located on opposite sides of the strip, said members being complementally formed to provide a weakened line laterally of the strip.

33. In a machine of the class described, a strip supply, strip-applying mechanism including a band-like member adapted to be moved toward and from strip-applying position, means in advance of said mechanism for weakening the strip at intermittent points of its length, said applying mechanism providing the sole feed for the strip, and means carried by said mechanism for frictionally engaging the strip to provide a tension thereon.

34. In a device of the character described, a blank carrier, opposing mandrels having relative movements to yieldingly clamp the box elements, one of said mandrels being adapted to extend through said carrier, said mandrel being movable axially and having an element extending in the plane of the box blank during the movements of the mandrel therethrough, the length of movement of said element being restricted to withdraw its face from blank contact when the mandrel has withdrawn the blanks from the carrier.

35. In a machine of the class described, a blank carrier, opposing mandrels adapted to yieldingly clamp box elements and movable to withdraw said elements from the carrier, one of said mandrels having an annular element movable therewith within restricted limits, said mandrel with its element forming a gripping face variable in area.

36. In a machine of the class described, opposing mandrels having relative movements to yieldingly clamp box elements, one of said mandrels comprising an intermittently rotatable shaft carrying a plurality of gripping fingers and also having a blank gripping member yieldable axially of the shaft, said fingers and element being complementally formed to provide gripping engagement under such yielding action, and an independent member adapted to release the finger grip as the yielding member returns to normal position.

37. In a machine of the class described, opposing mandrels adapted to yieldingly clamp box elements, means for applying a strip to such clamped box elements, said strip having a width greater than the depth of the box elements, mechanism for turning in the projecting portions of the strip, and independent mechanism for tucking in one of the turned-in portions of the strip, means being provided for rotating the box elements during such turning in and tucking in operations.

38. In a machine of the class described, opposing mandrels adapted to yieldingly clamp box elements, means for applying a strip to such clamped box elements, said strip having a width greater than the depth of the box elements, mechanism for turning in the projecting portions of the strip, said means being in the form of a rotating element and being movable toward and from blanks during such contact.

39. In a machine of the class described, opposing mandrels adapted to yieldingly clamp box elements, means for applying a strip to such box elements, said strip having a width greater than the depth of the clamped box elements, mechanism for turning in the projecting portions of the strip, and independent mechanism for tucking in one of the turned-in portions of the strip, said tucking-in mechanism comprising annular members movable relatively to each other in the direction of their axis, means being provided for rotating the box elements during such turning in and tucking in operations.

40. In a machine of the class described, opposing mandrels adapted to clamp box elements, means for applying a strip to said elements with an edge of the strip turned in, and tucking-in mechanism for said turned-in edge, said mechanism comprising a reciprocating member movable in the direction of the axis of one of the mandrels, and a sleeve carried thereby and movable relatively thereto in the direction of reciprocation, the movements of said sleeve and member permitting said member to project beyond the sleeve and tuck in the turned-in portions as the box elements are rotated.

41. In a machine of the class described, covering mechanism including a pair of mandrels movable axially to position the blanks within the covering mechanism, one of said mandrels being rotatable at different speeds after the blank has been positioned, the direction of rotation being the same at all speeds.

42. In a machine of the class described, mechanism including a pair of mandrels adapted to position the blanks within the covering mechanism, and means for rotating one of said mandrels at different speeds after the blank has been positioned, said means including gear faces of different radius carried by the mandrel, and a gear having gear faces complementary to the mandrel gear face and adapted to coöperate therewith successively, whereby the direction of rotation of the mandrel will be the same at all speeds.

43. In a machine of the class described, a rotatable blank carrier, said carrier having a plurality of peripheral notches, means for intermittently rotating the same, said means comprising a reciprocating member, a bell crank lever mounted on said member and having one of its arms in the form of a pawl adapted to engage the notches, and means connected to said lever for reciprocating said member and placing a leverage action on the pawl.

44. In a machine of the class described, a rotatable blank carrier, said carrier having a plurality of peripheral notches, means for intermittently rotating the same, said means comprising a reciprocating member, a bell crank lever mounted on said member and having one of its arms in the form of a pawl adapted to engage the notches, means connected to said lever for reciprocating said member and placing a leverage action on the pawl, and an arm adapted to limit the leverage action in one direction.

In testimony whereof I have hereunto set my hand in presence of two subscribing witnesses.

FRANK GRAEBER.

Witnesses:
 JOHN T. STAIRS,
 JOHN A. FITZPATRICK.